Figure 1A:
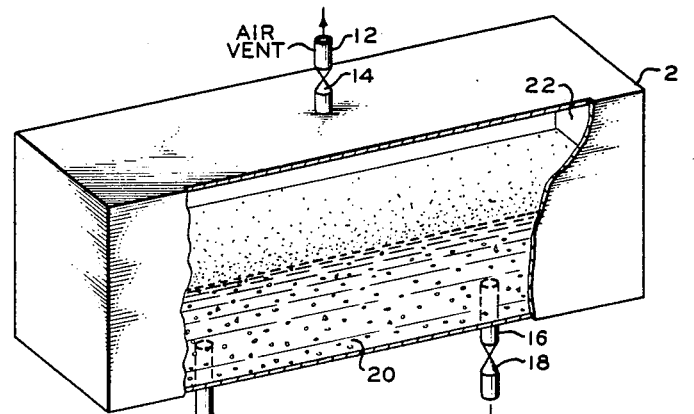

July 23, 1963

H. O. DIXON 3,098,754

METHOD FOR PREPARING CELLULAR CEMENT

Filed Jan. 23, 1959

INVENTOR.
H.O. DIXON

BY Hudson and Young

ATTORNEYS

United States Patent Office 3,098,754
Patented July 23, 1963

3,098,754
METHOD FOR PREPARING CELLULAR CEMENT
Henry O. Dixon, Bartlesville, Okla., assignor to Phillips Petroleum Company, a corporation of Delaware
Filed Jan. 23, 1959, Ser. No. 788,621
2 Claims. (Cl. 106—88)

This invention relates to a new and useful cellular cement and method for the preparation of said cement. In one aspect it relates to a cellular cement formed by air blowing, which is readily dissolved by dilute acid.

It is an object of this invention to provide an improved cellular cement and method for the preparation of said cement.

Another object of the invention is to provide an improved process for forming a cellular rigid cement in a confined space.

Still another object of the invention is to provide a process for forming a temporary cellular cement structure and removing said structure by acidation.

These and other objects of the invention will become more readily apparent from the following detailed description and discussion.

The foregoing objects are achieved broadly by agitating a mixture of cement, hydratable clay and water with air and then allowing the mixture to set until it hardens.

In one aspect of the invention, shale is added to the mixture prior to agitation.

In another aspect of the invention, the mixture is aerated in a confined form, completely filling said form to provide a rigid temperature insulation or structural member.

In still another aspect of the invention cellular cement is prepared for temporary use, for example, as a plug in a well, and is removed by contacting the cement with dilute acid.

In preparing the cellular cement the various components are thoroughly mixed to form a homogeneous slurry. The particular order of mixing is not important, thus the solids can be thoroughly mixed and then introduced to the water or vice versa, or each of the solids can be individually added to the water in any desired order. The relative proportions of the components of the mix will vary depending on the density of the cement desired. Usually it is preferred to employ between about 2 and about 50 volumes of hydratable clay and between about 100 and about 300 volumes of water per 100 volumes of cement. Depending on the amount of air entrained therein the cements will vary in density within the range of between about 0.25 and about 0.75 of the density of non-porous cement. It is desirable, particularly when employing smaller amounts of clay to incorporate shale in the mixture, usually in an amount between about 5 and about 25 volumes per 100 volumes of cement. An excellent cellular cement of low density is provided by using between about 4 and about 25 volumes of clay, between about 10 and about 20 parts of shale, and between about 100 and about 250 parts of water. The cement employed in the mix can be ordinary Portland cement. Various hydratable clays can be used including Bentonite, Montmorillonite, Hectorite and other clays which are capable of forming gels with water. The shales which can be added to the mixture include silica, various clays, sand, silt, etc.

Both the hydratable clay and shale are employed in subdivided form, preferably within the size range of between about 50 and about 200 mesh.

After the mixture or slurry is prepared it is contacted with air in a sufficient amount to provide substantial agitation of the mix. The mix when agitated expands in volume reaching during agitation the final volume it will occupy. Additional air beyond the amount required to provide the final volume of cement can be used; however, it is not normally preferred since no particular advantage is provided. The time of agitation will vary depending on the composition of the mix; however, usually it is preferred to agitate the mix for at least 30 minutes and preferably between about 1 and about 5 hours. After termination of the agitation the mix is allowed to set until it hardens.

The cellular cement can be employed for various purposes including structural forms, fireproofing material, insulation, etc. Because of its porosity and low density the cement is easily dissolved by dilute acid and thus can be used in temporary structures, for example, in well bores or temporary forms, etc. Removal of the cement after use is readily accomplished by passing the acid such as dilute hydrochloric acid in contact with the cement until it dissolves or decomposes.

Figure 1B:
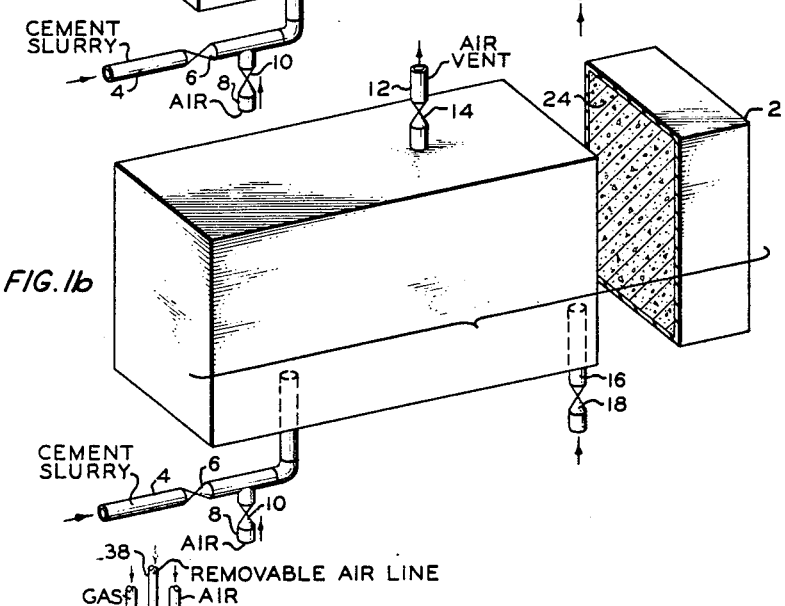
Figure 2:
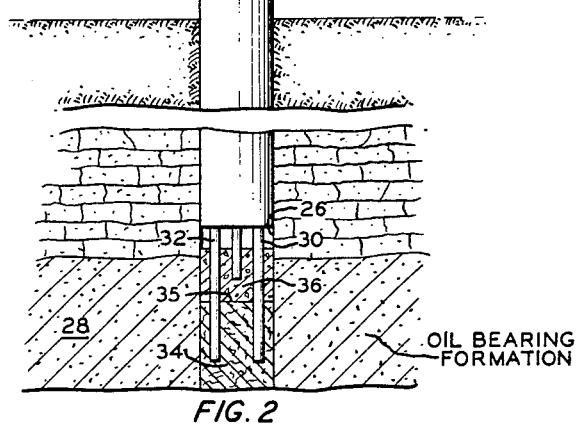

In order to more clearly describe the invention in its various embodiments and provide a better understanding thereof, reference is had to the accompanying drawings of which:

FIGURE 1 is a diagrammatic illustration of a form suitable for use in preparing cellular cement structures; and FIGURE 2 is a diagrammatic illustration of an application of the invention in a bore hole for underground gasification.

Referring to FIGURE 1(a) there is provided a confined rectangular form 2 connected to conduits 4 and 8 containing valves 6 and 10, respectively, communicating with the bottom of said form a third conduit 16 containing valve 18 also communicating with the bottom of said form, and a fourth conduit 12 containing valve 14 attached to the top portion of said form. FIGURE 1(b) represents a duplicate of the form of FIGURE 1(a). In the use of the forms of FIGURE 1 valves 6 and 14 are initially open and valves 10 and 18 are closed. A cement slurry consisting of Portland cement, finely subdivided hydratable clay and shale admixed with water in suitable proportions is introduced to form 2 through conduit 4 and valve 6. A portion of the form 20 is filled with slurry, the remainder of the form 22 being left empty. When the flow of slurry is terminated valve 6 is closed and valve 10 is opened with air being introduced through conduit 8 into the cement mix. Sufficient air is introduced to provide agitation and turbulence in the mix such that the mix expands to fill substantially the entire volume of form 2 as shown in FIGURE 1(b). During the agitation and expansion of the mix the air introduced through conduit 8 is removed from the form through conduit 12 and valve 14. Agitation of the mix is continued for a period of about 1 hour after which the flow of air is halted and valves 10 and 14 are closed. A sufficient period of time is then allowed for the cement to harden after which conduits 4, 12 and 16 can be disconnected from the form. If desired form 2 can be constructed in such a manner as to be readily removable from the cellular cement structure or in the alternative the form and the cement can be used as a single unit. If it is not desired to retain the form permanently removal of the cement can readily be effected by introducing dilute acid, such as hydrochloric acid, through any of conduits 4, 8 or 12 and removing decomposed or dissolved cement through conduit 16 and valve 18.

Another embodiment of the invention wherein the cellular cement is particularly employed in temporary use is set forth in FIGURE 2. Referring to FIGURE 2, there is provided a bore hole 26 which extends downwardly into oil bearing formation 28. An air conduit 30 and a gas conduit 32 are provided for introducing air and gas into the bore hole and from there to the oil bearing formation. The lower portion of each of these conduits is surrounded by a mass of granular non-combustible material, such as gravel, chat, refractory material, etc. Over the packing is a layer 36 of the cellular cement of this invention. Separating the packing and cement is a suitable material 35 which can be a heavy paper, plastic or other material of sufficient weight to prevent the cement from flowing into the packing during agitation and hardening. The cement layer 36 is formed by introducing a slurry of cement, clay, shale and water of suitable proportions into the bore hole, agitating the slurry with air introduced through air line 38 for a period of time and then removing the air line and allowing the agitated mass to harden. The resulting cellular cement forms an effective noncombustible seal between the atmosphere and packing 34. Removal of the cellular cement from the bore hole is readily effected by introducing dilute acid to the cement mass, for example, through line 38, until the cement is decomposed or dissolved. The cement can then be removed from the bore hole with a pump or other suitable means.

The preceding embodiments have been directed to specific illustrations of the invention; however, it is within the scope of the invention to employ other apparatus and procedures in forming a cellular cement, the invention broadly being in the agitation of the admixture of cement, hydratable clay, and water as hereinbefore set forth.

The following data are presented in illustration of the invention.

A series of runs was carried out in which admixtures of Portland cement, hydratable clay, shale and water were agitated with air and allowed to stand for a sufficient period of time to allow setting up of the cement. The results are presented in Table 1.

It is noted from the data of Table 1 that the use of clay and a combination of clay and shale provides a completely cellular cement. The use of shale alone produces only a partially cellular material, as also does the mix which contains neither cay nor shale. Run No. 3 illustrates the importance of the amount of water used in the mix.

Two samples of cellular cement were agitated in hydrochloric acid to determine the solubility of the cement in this medium. The results are presented in Table 2.

*Table 2*

| Test No. | 1 | 2 |
|---|---|---|
| Cellular Cement, gm | 6.095 | 3.030 |
| Acid[1], ml | 100 | 100 |
| Undissolved Residue, gm | 1.10 | 0.53 |
| Cement Dissolved | 82.0 | 82.0 |
| Time, hours | 1 | 1 |

[1] 20% HCl.

Having thus described the invention by providing specific examples thereof, it is to be understood that no undue limitations or restrictions are to be drawn by reason thereof and that many variations and modifications are within the scope of the invention.

I claim:

1. The method for forming a rigid unit of cellular cement which comprises providing a confined form, forming a slurry consisting essentially of between about 4 and about 25 volumes of hydratable clay, between about 10 and about 20 volumes of shale and between about 100 and about 250 volumes of water per 100 volumes of Portland cement, introducing the slurry to said form in an amount sufficient to fill only a portion of the form, introducing air only into said form in sufficient quantity to agitate said slurry and expand said slurry to fill said form, agitating said slurry for a period between about 1 and about 5 hours and thereafter allowing the agitated mix to set until hard, said set mixture filling said form.

2. The method of claim 1 in which the form is removed after the agitated mix has hardened.

*Table 1*

| Run No. | Cement, cc. | Hydratable Clay, cc. | Shale, cc. | Water, cc. | Volume of Cellular Cement/volume of Original Mix | Air Mixing Time, Hours | Description of Product |
|---|---|---|---|---|---|---|---|
| 1 | 207 | 16.3 | | 260 | 2/1 | 2.25 | Non-uniform cell distribution; light; friable. |
| 2 | 100 | 25 | | 250 | 1.2/1 | 1.00 | Same as Run No. 1. |
| 3 | 100 | 8 | | 60 | | 1.50 | No stable emulsion. |
| 4 | 200 | | | 175 | 3/1 | 0.75 | Top ⅔ cellular; bottom ⅓ non-cellular solid. |
| 5 | 150 | 4 | 20 | 150 | 2.5/1 | 0.75 | Same as Run No. 1. |
| 6 | 100 | | 50 | 120 | | 2.25 | Top ⅔ cellular; bottom ⅓ non-cellular solid. |
| 7 | 100 | | 100 | 200 | | 0.75 | No stable emulsion. |

References Cited in the file of this patent

UNITED STATES PATENTS

| | | |
|---|---|---|
| Re. 17,207 | Collins | Feb. 5, 1929 |
| 1,916,949 | Harrison et al. | July 4, 1933 |
| 1,985,905 | Rice | Jan. 1, 1935 |
| 1,995,540 | Harrison | Mar. 26, 1935 |
| 2,123,804 | Rice | July 12, 1938 |
| 2,225,150 | Bechtold | Dec. 17, 1940 |
| 2,236,987 | Bechtold | Apr. 1, 1941 |
| 2,705,050 | Davis et al. | Mar. 29, 1955 |
| 2,761,511 | Billue | Sept. 4, 1956 |
| 2,770,560 | Hobson | Nov. 13, 1956 |
| 2,776,713 | Morgan | Jan. 8, 1957 |
| 2,782,857 | Clark et al. | Feb. 26, 1957 |
| 2,800,963 | Roberts et al. | July 30, 1957 |
| 2,864,714 | Dixon | Dec. 16, 1958 |